Figure 1:
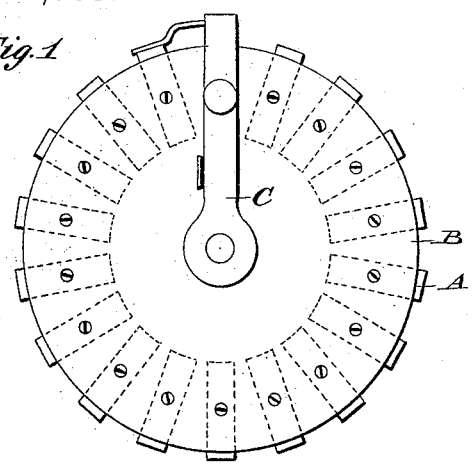

(No Model.) 2 Sheets—Sheet 1.

H. W. LEONARD.
METHOD OF MANUFACTURING RHEOSTATS, ELECTRIC HEATERS, &c.

No. 598,568. Patented Feb. 8, 1898.

Witnesses:
Jas. F. Coleman
W. Pfizer

Inventor
H. Ward Leonard
By Rich. N. Dyer,
Atty.

(No Model.) 2 Sheets—Sheet 2.

H. W. LEONARD.
METHOD OF MANUFACTURING RHEOSTATS, ELECTRIC HEATERS, &c.

No. 598,568. Patented Feb. 8, 1898.

Witnesses:
Jas. F. Coleman

Inventor
H. Ward Leonard,
By Rich. N. Dyer,
Att'y.

UNITED STATES PATENT OFFICE.

HARRY WARD LEONARD, OF NEW YORK, N. Y.

METHOD OF MANUFACTURING RHEOSTATS, ELECTRIC HEATERS, &c.

SPECIFICATION forming part of Letters Patent No. 598,568, dated February 8, 1898.

Original application filed April 9, 1897, Serial No. 631,410. Divided and this application filed January 3, 1898. Serial No. 665,340. (No model.)

*To all whom it may concern:*

Be it known that I, HARRY WARD LEONARD, a citizen of the United States, residing at New York city, in the county and State of New York, have invented a certain new and useful Improvement in the Method of Manufacturing Rheostats, Electric Heaters, and Similar Apparatus, of which the following is a specification.

My invention relates to rheostats and similar apparatus, in which a number of separate "steps" of resistance are used and are in mechanical contact practically through their entire length with insulating material.

My principal object is to simplify the manufacture, reduce the cost, and improve the quality of the apparatus.

I have devised a method of designing such rheostats so that the minimum amount of wire and of radiating-surface is required to secure a certain result. My method is to so arrange the resistances of the various steps that the watts developed in each step when it is subjected to its maximum normal current is practically the same. To explain this more fully, I will state that in most rheostats—for example, field-rheostats—the current which flows through the rheostat and the translating device is decreased step by step as the successive steps of the rheostat-resistance are inserted into the circuit. If the ohms of each step are the same, the volts of each step in such a rheostat when it is subjected to its normal maximum current will not be the same, but on the contrary the maximum watts per step will rapidly increase in the steps as the contact-lever is moved toward the short-circuit position of the rheostat; but the best results would be secured if each step when working at its normal watts were worked to the maximum safe limit. The number of contacts on a rheostat and its design make it desirable to have a certain fraction of the whole radiating-surface allotted to a step, and even when the radiating area of the steps is varied, as in some cases, the most economical results will be obtained when the maximum watts per square inch is constant for each step when operating under its maximum normal duty. This method of designing rheostats is entirely new with me, as far as I know, and gives very great economy.

It is evident that where the current is reduced as resistance is inserted, as in field-rheostats, theater dimmers, &c., only one step at a time will be subjected to its maximum watts. The steps on one side of the contact-lever will be entirely out of circuit and those on the other side will not receive their maximum current. The step first in circuit next to the contact-lever will always be subjected to its maximum watts, and as the contact-lever is moved over the contacts each step as it occupies this position will be subjected to its maximum watts. It will be evident that if the maximum watts of all the steps are added the sum of the maximum watts of the steps will be far in excess of the maximum watts which the rheostat as a whole can receive at any instant.

I have found that definite mathematical relations exist between the maximum watts of the translating device and the sum of the maximum watts of the steps. This relation varies with different classes of translating devices, but if, for example, I have to design a special field-rheostat and I know the maximum watts of that field, I know that if I take fifty per cent. of the maximum watts of the field it will represent the sum of the maximum watts of the rheostat-steps in a rheostat of a satisfactory design, and knowing the desired number of steps I get the maximum watts per step, and knowing the safe working maximum watts per square inch I get the square inches I must allow for each step, and hence for the rheostat as a whole. By this method I can secure the best possible result, for while making the rheostat large enough I do not make it unnecessarily large, and it will be observed that this method is especially adapted to rheostats in which the various steps have in close proximity thereto a heat conducting and absorbing mass, such as cast-iron.

In making up such rheostats as I have described it will be evident that if the maximum watts per step is, say, twelve watts and the full current through the field-winding two amperes when only the first step is in circuit, I would make the first step three ohms, so that the $C_2R$ will be twelve watts. The next step would have a maximum current less than the first because of the insertion of the three ohms of the first step into the circuit. After determining this current by Ohm's law I then divide twelve watts by $C_2$ and get the ohms for the second step. While the steps of the resistance so produced may be attached to a common support and properly connected together, I prefer to provide a separate support for each step of the resistance, and which supports are mounted upon a common support and the steps connected together, the entire construction being such as to permit the removal and replacement of any one or more of the separable supports without disturbing the others. These supports may be in the form of cores of cylindrical or other shape, upon which the resistance is wound, or in the form of plates or blocks, to which the resistance is attached in any suitable manner, and in either form the resistance will be suitably insulated when its support or the common support is made of metal. Having wires of various sizes and resistivities I can readily secure a wire which when arranged practically identically with the wire of the first step upon the separable support will have the required resistance for the second step.

Since the maximum watts per step of resistance is practically the same for all steps, the size of the separable steps will be practically uniform, and hence in the form of apparatus illustrated the cores or supports for the resistance-steps will be uniform and the size and resistivity of the conductor will be varied, so that the length of the conductors will be about uniform and extend over a uniform space on the support. By carrying in stock a graduated line of these separable steps of uniform size rheostats can be assembled to fill any requirement on short notice. In case of a defective step from any cause it is only necessary to replace the defective step by another, which is simple, cheap, and expeditious. For field-rheostats to control generators of approximately one hundred and twenty-five volts I will provide a number of these standard separable steps progressing gradually and properly from a certain large current, with its proper corresponding ohms to make the desired maximum watts per step, to the other extreme, where a very small current and its proper corresponding ohms would make practically the same maximum watts per step. While it is preferable to arrange the separable steps of the resistance so that the increase or decrease in current will be gradual from one extreme to the other, it may be permissible or desirable in some instances to arrange the steps in pairs, the two steps of each pair having the same number of ohms; but the number of ohms of the steps of one pair will be different from the number of ohms of the steps of other pairs. Similarly, the steps while tapered as a whole might be grouped in sets of three or four steps of equal ohms.

It will be noted that I have assumed an exciting source of constant electromotive force. In case the generator be self-exciting the rheostat would be unnecessarily large on the high-resistance steps, but as the rheostat-builder cannot be sure as to whether the machine will be self-exciting or separately excited, the rheostat should be designed so as to be suitable for either case.

My invention as applied to rheostats is illustrated in the accompanying drawings, in which—

Figure 2:
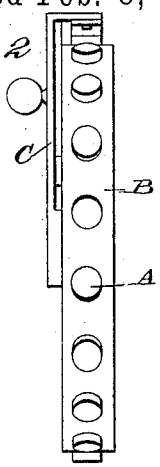
Figure 3:
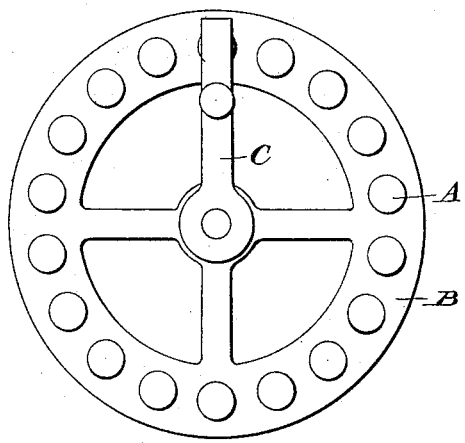
Figure 4:
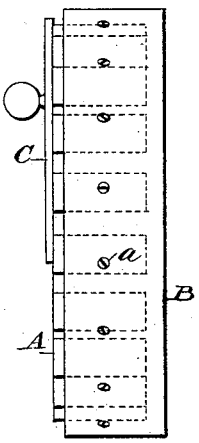
Figure 5:
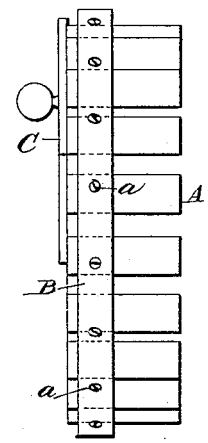
Figure 6:
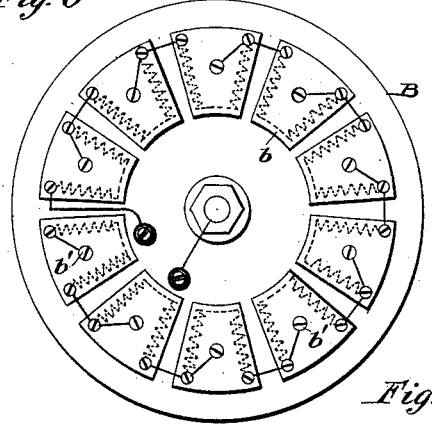
Figure 7:
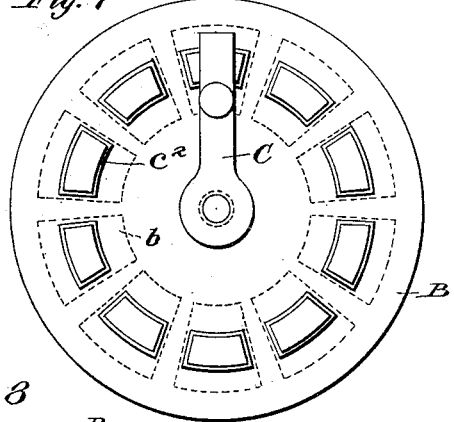
Figure 8:
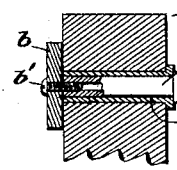
Figure 17:
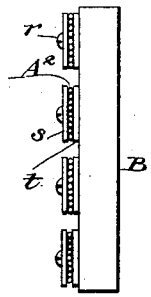

Figures 1 and 2 are plan and edge views, respectively, of one form of my improved rheostat, in which each step of the resistance is separate and self-contained, made in cylindrical form and carried by a suitable support. Figs. 3 and 4 illustrate a modified form of the rheostat of Figs. 1 and 2. Fig. 5 illustrates a further modification of the form of Figs. 1 and 2. Figs. 6 and 7 are plan views of opposite sides of a rheostat provided with a series of small plates attached thereto and which small plates carry the sections of the resistance. Fig. 8 is a sectional view showing the mode of connecting the steps of the resistance with the contact-plates in the form of rheostat shown in Figs. 6 and 7. Figs. 9 to 16 illustrate various forms of cores for the steps of the resistance, and Fig. 17 illustrates a modification of the arrangement of Fig. 6.

In Figs. 1 to 4, inclusive, the sections or steps of the resistance are wound upon suitable cores A, made either of metal, pottery, porcelain, steatite, or any other suitable insulating material, and which cores are inserted in holes of suitable diameter in the supporting-plate B, which may be of any suitable material, but preferably of cast-iron. C is the contact-lever. When metallic cores are employed for the steps of the resistance, the cores are insulated with asbestos or other suitable material and the resistance wound thereon, and when a metallic supporting-plate is employed the metallic core and the resistance are suitably insulated from the supporting-plate. Each step of the resistance when metallic cores are employed may have one end attached to its core, the other end being attached to an adjacent core, and with this arrangement the contact-lever of the rheostat makes contact with the exposed end of the cores. When cores of insulating material are employed, they are provided with contact-buttons on the exposed ends and to which the steps of the resistance are attached.

In Figs. 1 and 2 the cores are inserted in holes cast or drilled radially in the supporting-plate. In Figs. 3 and 4 the supporting-body is in the form of a wheel with a heavy rim, into which the cores with the steps of the resistance are inserted, either radially, as in Figs. 1 and 2, or parallel with the axis of the wheel, as shown, and the contact-lever C is pivoted at the hub of the wheel.

In Fig. 5 the supporting-plate is much thinner than the plate of Figs. 3 and 4, and the cores with the steps of the resistance are inserted in a series of holes in the plate, the greater length of the cores being exposed to the air. In the arrangements of Figs. 1 to 5 the cores are preferably held in position by set-screws $a$.

In Fig. 6 the separate steps of the resistance are attached to small plates $b$ either by enamel or equivalent material in the well-known manner or in any other suitable manner. The plates $b$ are secured to the large supporting-plate by screws $b'$, which screw into the shanks $c'$ of the contact-plates $c$. (See Fig. 8.) A contact-plate $c$ is provided for each plate $b$, and the plates $c$ and shanks $c'$ are insulated from the plate B by insulation $c^2$.

Figure 9:
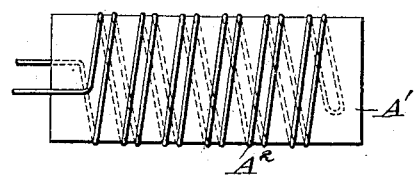
Figure 10:
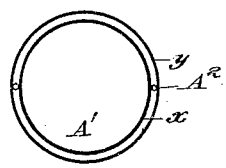
Figure 11:
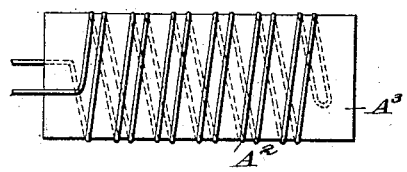
Figure 12:
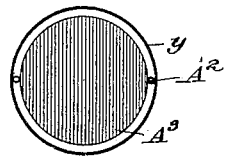
Figure 13:
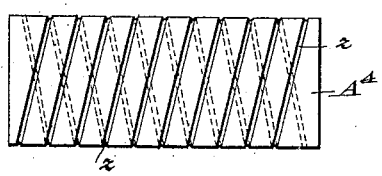
Figure 14:
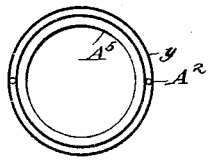

The cores for the steps or sections of the resistance may be of metal, such as cast-iron, and covered with a suitable layer of insulation, upon which the resistance is wound and then covered by a layer of insulating material. Such a form is shown in Figs. 9 and 10, in which $A'$ is the metal core, covered by a layer of insulation $x$, upon which the conductor $A^2$ is wound. After the resistance is placed upon the core it is covered by a layer of insulation $y$. Instead of the iron core a core of insulating material may be employed, upon which the conductor is wound and then covered by a layer of insulation, as illustrated in Figs. 11 and 12. In those figures $A^3$ is the core of insulating material, $A^2$ is the resistance, and $y$ the layer of insulation covering the resistance. Either of the cores described may, if desired, be provided with one or more spiral grooves, as illustrated in Fig. 13, in which the resistance may be wound, as will be readily understood. In this illustration $A^4$ is the core, and $z$ the spiral grooves. Such a core may be made either of insulating material or of metal, such as cast-iron, and when made of metal the core will be suitably insulated, as in the arrangement of Figs. 9 and 10, either by applying the insulating material over the entire surface or only in the spiral grooves. The cores so far described have been indicated as solid cores; but it will be readily understood that a tubular core may also be employed, as indicated in Fig. 14. In this illustration $A^5$ is a tubular core, either of metal or insulating material, such as asbestos, upon which the conductor $A^2$ is placed and covered by a layer of insulating material $y$.

Figure 15:
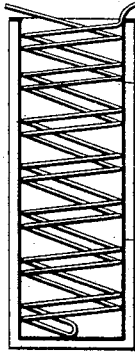

In the arrangement illustrated in Fig. 15 a metal tube $A^6$ is employed, which is provided with an inner coating of insulation $w$, and the conductor $A^2$ is formed into a helix and inserted into the tube or shell, the diameter of the helix being such as to fit snugly within the tube.

Figure 16:
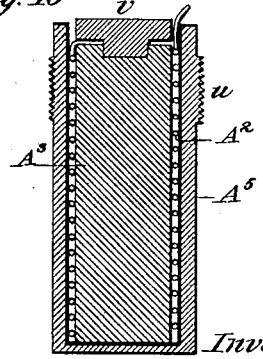

In the arrangement illustrated in Fig. 16 the conductor is wound upon a core of insulating material $A^3$, as in Figs. 11 and 12, and this core is inserted into a metal tube or shell $A^6$ similar to the tube illustrated in Fig. 15. In this figure I have shown a metal contact-button $v$, attached to the insulated core, and one end of the conductor $A^2$ is placed underneath the button, so as to be held in contact therewith, and the other end of the conductor is left free for attachment to the adjacent section of the resistance. The shell $A^6$ of Fig. 16 I have shown provided with a screw-thread $u$, which is adapted to engage with a screw-thread on the main supporting-plate, thus affording a ready means of attaching the core, with its protecting-shell, to the main support.

In Fig. 17 I have illustrated a metal support B, which carries a series of resistance-steps, the steps $A^2$ being held between two disks of insulating material $s$ and $t$. The disks may be of mica, porcelain, asbestos, or other suitable material. The two disks with the resistance-step between them are secured to the support B by screws $r$. With this arrangement the contact-plates and contact-lever may be disposed upon the opposite side of the support, as in the construction of Figs. 6 and 7, or the contact-lever may be placed on the same side of the support as the disks and make contact with suitable plates or buttons adjacent to or upon each of the disks $s$. The circuit connections will be the same as in Fig. 6.

All of the cores so far described are adapted to be inserted into either of the forms of supporting-plates illustrated in Figs. 1 to 5, inclusive. If desired, the holes into which the cores of Figs. 9 to 14 are inserted may be provided with a layer of insulation instead of applying the layer of insulation $y$ to the cores to insulate the resistance from the supporting-plate when made of metal.

The insulating material for insulating the resistance from the metal cores and the resistance from the metal supporting-plates may be mica, asbestos, enamel, or similar vitreous material, or adhesive mineral compound. When the insulating material is an adhesive one, it may be employed to attach the conductor to the support, which is the mode preferred for the form of rheostat shown in Figs. 6 and 7.

I do not claim herein a rheostat or equivalent apparatus in which electric energy is converted into heat having in combination a common support and several separable steps of resistance so attached to said support that the resistance lies in close proximity to the support practically throughout its length, whereby a large portion of the heat energy developed in said steps under operative conditions will be rapidly transmitted to said support, since that feature is claimed in my application, Serial No. 631,410, filed April 9, 1897, and of which the present application is a division.

What I claim is—

1. The method of arranging the resistance of a rheostat into steps, consisting in making the ohms of each step practically proportionate inversely to the square of the current through the step when it is subjected to its maximum duty so that the current squared times the resistance under maximum conditions will be practically constant per square inch for each step, substantially as set forth.

2. The method of making rheostats in which the current is tapered from any desired maximum to any desired minimum, consisting in making independent, separable steps of resistance carried by independent supports of similar design and size and having different current capacities and correspondingly different resistances and selecting and arranging a set of such separable steps so that as the resistance-steps are inserted in the circuit the current capacity of that step will be the current suited to that step, substantially as set forth.

3. A rheostat having in combination a number of separable resistance-steps, each step of resistance being of practically the same size and design and the ohms of a series of the steps being tapered progressively, and a common support for the steps of the resistance, substantially as set forth.

4. A rheostat for varying the current in a circuit having the steps of the resistance so arranged that the watts developed in each step when subjected to its maximum normal duty shall be practically the same as the maximum watts in each of several other steps, and a heat-conductive support to which said steps are attached and to which is conducted a large portion of the heat energy developed in the steps of the resistance, substantially as set forth.

5. A rheostat having the resistance arranged in steps upon a heat-conductive support, the steps of the resistance being so arranged and proportioned that when each step is subjected to its maximum duty the watts generated therein will be at a practically constant rate per square inch, a large portion of the heat energy developed in the steps of the resistance being conducted to the support, substantially as set forth.

6. A rheostat having in combination a common cast-iron support and a series of separable steps of resistance so attached to the said support that the resistance material lies in close proximity to the common support practically throughout its length, the resistance of the steps being varied, substantially as set forth.

7. A rheostat having a cast-iron support and several separable steps of resistance, the resistance of said steps being progressively varied and insulated from the cast-iron support by a layer of mineral material, substantially as set forth.

8. A rheostat having a cast-iron support and several separable steps of resistance, the steps being progressively varied and carried by supports adapted to be attached to said cast-iron support, the resistance of each step being insulated from its support by a mineral material, substantially as set forth.

9. A rheostat having several steps, the resistance of the several steps being such that the resistance of different steps vary practically proportionately and inversely as the square of the respective currents they will be subjected to when operating at their maximum duty, substantially as set forth.

10. A rheostat having several steps of tapered current capacity, the watts per square inch of each of the said several steps when it is operated at its maximum duty being practically constant, substantially as set forth.

11. A rheostat having a tapered current capacity, the maximum watts per square inch of several of its steps being practically constant, substantially as set forth.

12. A rheostat having several steps of tapered current capacity, the steps of resistance being placed in close proximity to a common support of a material which is a good conductor of heat, whereby the current capacity of the resistance material is increased due to the conduction of heat from the part of the support adjacent to the steps to cooler portions of the support, substantially as set forth.

This specification signed and witnessed this 30th day of December, 1897.

H. WARD LEONARD.

Witnesses:
 W. PELZER,
 EUGENE CONRAN.